United States Patent

[11] 3,546,371

[72] Inventor Sing Liong Tan
Emmasingel, Eindhoven, Netherlands
[21] Appl. No. 682,414
[22] Filed Nov. 13, 1967
[45] Patented Dec. 8, 1970
[73] Assignee U. S. Philips Corporation
New York, New York
a corporation of Delaware. by mesne assignments
[32] Priority Nov. 26, 1966
[33] Netherlands
[31] 6616679

[54] COLOUR CAMERA, IN WHICH A COLOUR-SEPARATING PRISM SYSTEM IS ARRANGED BETWEEN THE OBJECTIVE AND THE CAMERA TUBES
3 Claims, 3 Drawing Figs.

[52] U.S. Cl. 178/5.4
[51] Int. Cl. H04n 9/08
[50] Field of Search 178/5.4(O), 5.4(TCC), 5.4(8); 350/214, 187, 173

[56] References Cited
UNITED STATES PATENTS

| | | | |
|---|---|---|---|
| 2,971,051 | 2/1961 | Back | 178/5.4(O) |
| 3,202,039 | 8/1965 | DeLang et al. | 350/173 |
| 3,303,278 | 2/1967 | Beno et al. | 178/5.4(O) |

*Primary Examiner*—Robert L. Griffin
*Assistant Examiner*—Alfred H. Eddleman
*Attorney*—Frank R. Trifari

ABSTRACT: A color television camera employing camera tubes each responsive to a primary color and a color separating prism arranged between the objective and the camera tubes, a light deflection system being arranged between the color separating prism system and each of the camera tubes to compensate for the influence of the earth's magnetic field on the electron beams in the respective camera tubes so that the position of the camera tubes is independent of that magnetic field.

INVENTOR.
SING LIONG TAN
BY
Frank R. Trifari
AGENT

INVENTOR.
SING LIONG TAN
BY
Frank R. Trifari
AGENT

INVENTOR.
SING LIONG TAN
BY
[signature]
AGENT

COLOUR CAMERA, IN WHICH A COLOUR-SEPARATING PRISM SYSTEM IS ARRANGED BETWEEN THE OBJECTIVE AND THE CAMERA TUBES

The invention relates to a color television camera, in which a color-separating prism system is arranged between the objective and the camera tubes.

Such color camera is known and has the advantage that it occupies a comparatively small space. Moreover, disturbing polarization phenomena in the light passing through the system and hence disturbing color shifts in the image produced by the camera tubes are avoided. Finally, due to the compact construction of the prism system, the light paths between the objective and the camera tubes are comparatively short so that no particularly severe requirements need be imposed on the objective.

In the known camera, the reflected optical axes are not parallel to each other and to the nonreflected axis. This applies especially to the axes coinciding with the axes of the camera tubes. An arrangement of camera tubes in which the axes of the tubes are not parallel to each other, has a disadvantage. If the camera is pivoted about an arbitrary axis, the influence of the terrestrial magnetic field on the electron paths in the camera tubes varies differently for each tube. This variation, different for each tube, may give rise to undesirable displacements of the scanning point of the electron beam which are different for each individual tube.

The principal object of the invention is to provide a color television camera in which the position of the camera tube at all times is independent of the terrestrial magnetic field.

In accordance with the invention, a light-deflecting system is arranged between the color-separating prism system and each of the camera tubes in which the optical axes of the parts of the light-deflecting systems facing the camera tubes are parallel to each other. The arrangement is such that the parallel optical axes of the light-deflecting systems extend transversely to the plane containing the nonreflected and the reflected optical axes of the color-separating prism system. The camera tubes now occupy identical positions with respect to the terrestrial magnetic field. The influence of this field on the electron beams in the camera tubes is the same for each tube in each position of the camera so that a relative displacement of the electron beams is avoided. The step according to the invention further has the practical advantage that the electronic and the nonelectronic part of the camera become much more readily accessible. The exchange of components is considerably facilitated. The camera has a compact construction.

The invention will be described with reference to the drawing, in which FIG. 1 is a side elevational view;

Figure 1:
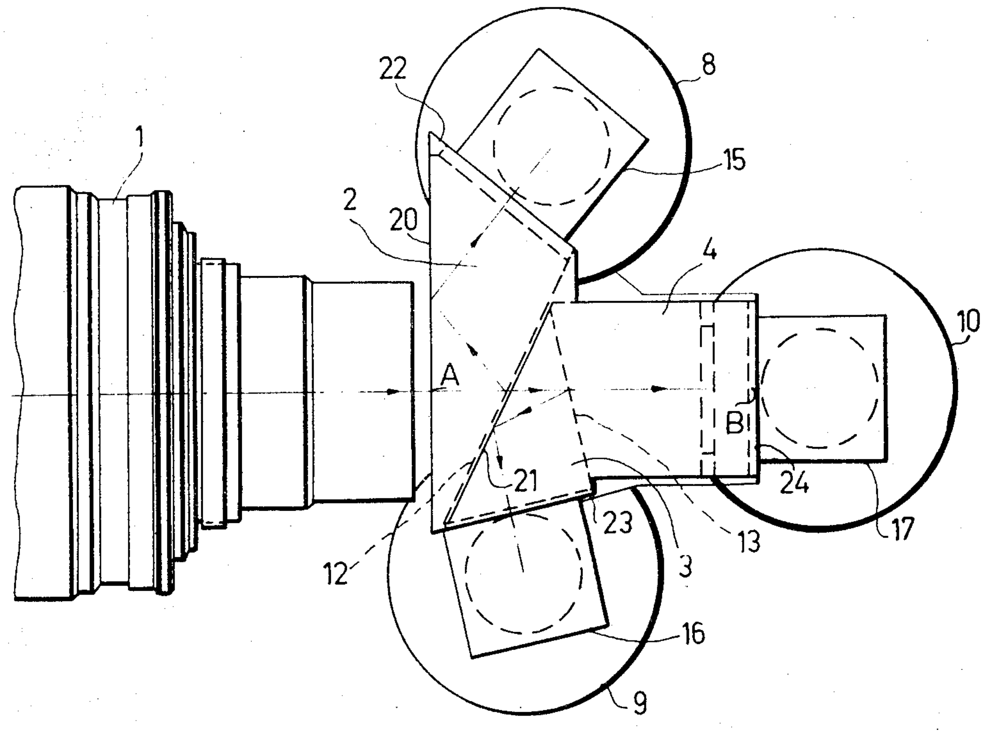
Figure 2:
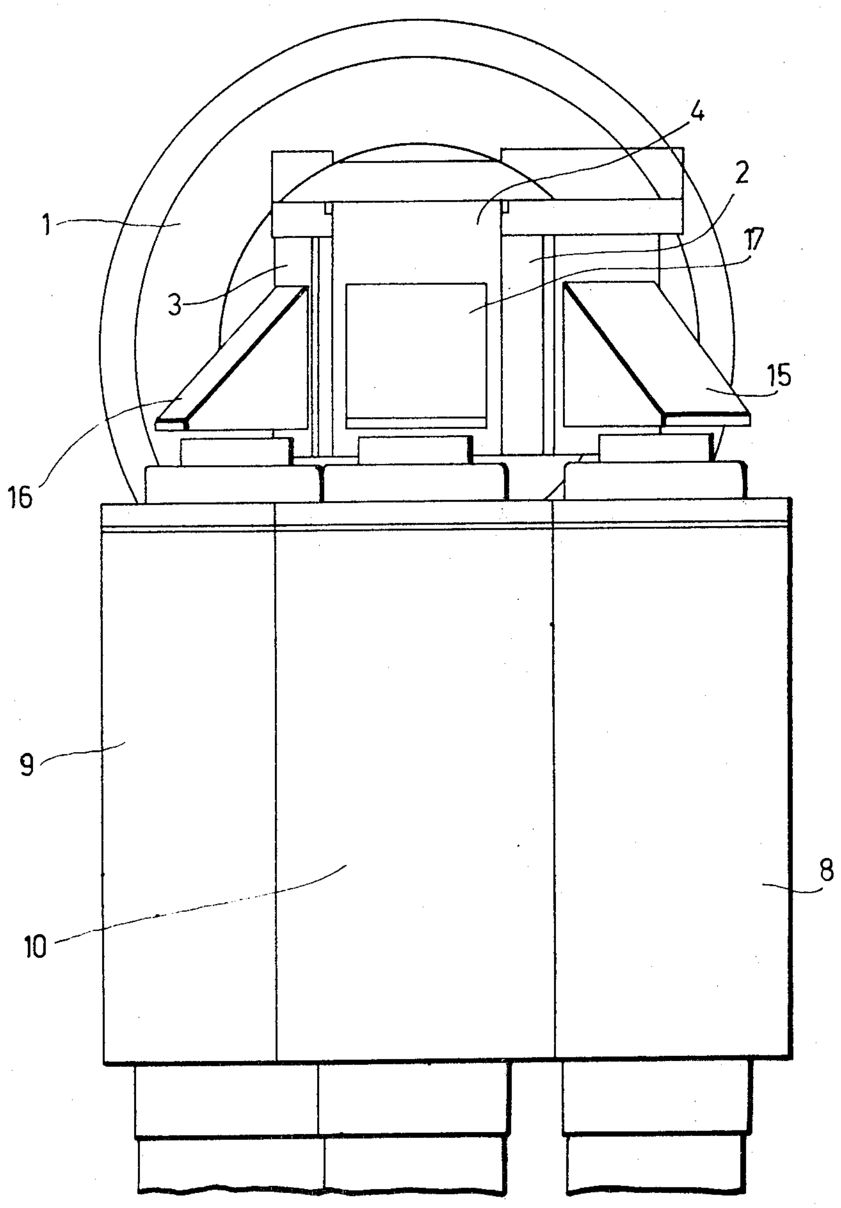
FIG. 2 is a front elevational view.
Figure 3:
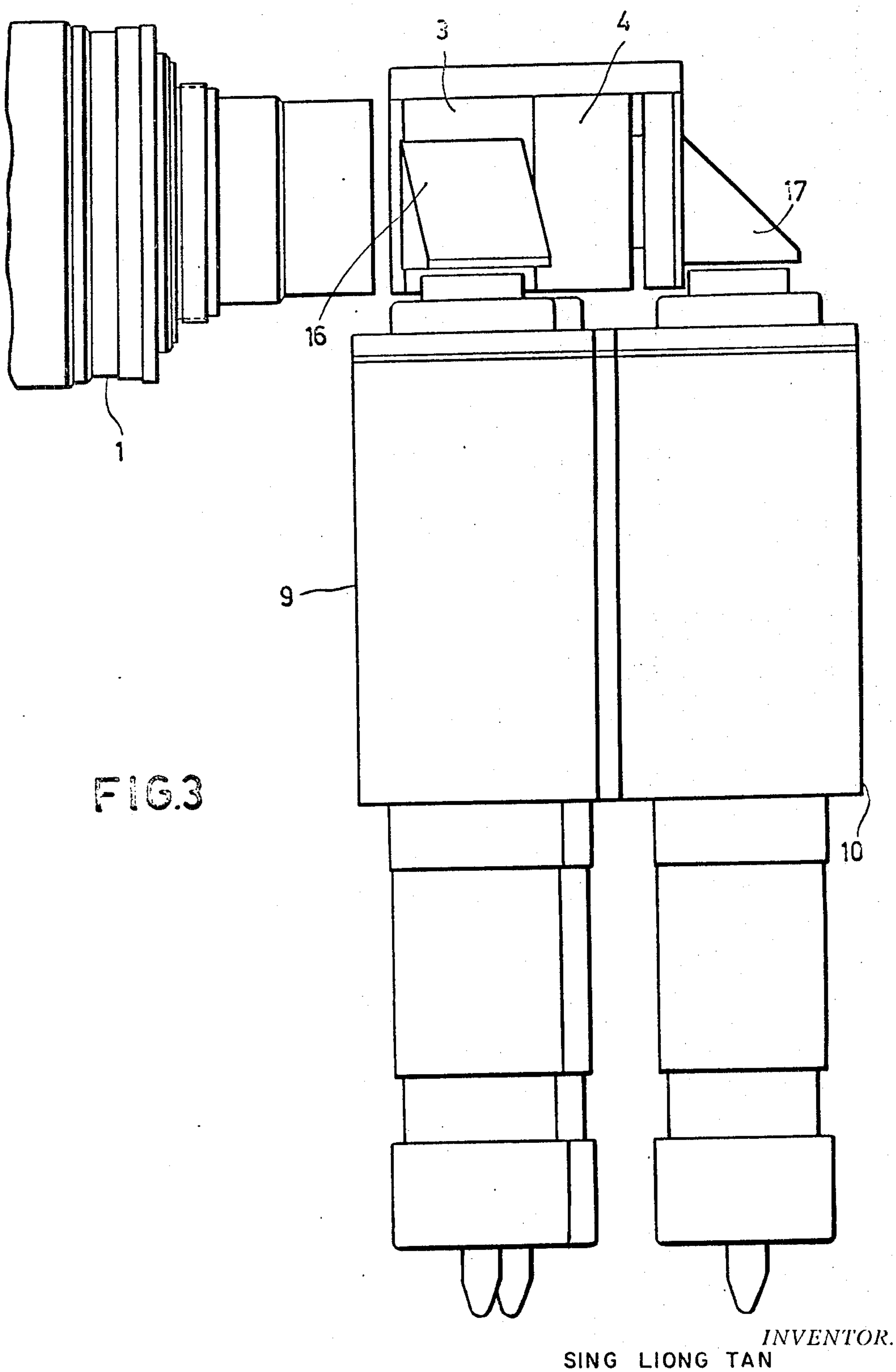
FIG. 3 is another elevational view of a camera according to the invention.

In the FIGS. reference numeral 1 denotes the objective of the camera. The color-separating prism system is composed of three parts denoted by 2, 3 and 4. The light originating from the scene passes through the objective 1 and is split up in the prism system into the primary components red, blue and green. The red component is produced by reflection from the dichroic layer 12. After complete reflection from the interface 20, this component strikes the camera tube 8. The light passed by the dichroic layer 12 is split up at the dichroic layer 13 into a green component which is transmitted and a reflected blue component. After having emanated from the prism part 4, the former component strikes the camera tube 10, while the latter component, after complete reflection from the interface 21, strikes the camera tube 9. The dichroic layers 12 and 13 make angles of less than 30° with planes at right angles to the nonreflected axis AB.

In the light path between the emanating faces of the prism system denoted by reference numerals 22, 23 and 24 and the camera tubes 8, 9 and 10, there are arranged prisms 15, 16 and 17 which are parallel to each other and extend transversely to the plane containing the nonreflected and the reflected optical axes.

Due to this construction of the camera, rotations of the camera about an arbitrary axis do not adversely affect the electron beam in the camera tubes. An additional advantage is obtained by the arrangement of the camera tubes. Since they are arranged transversely to the optical axes of the objective and the prism system, both the camera tubes with the associated electric circuits and the objective and the prism system are more readily accessible. The exchange of camera tubes, electrical circuits and of the optical system can be readily effected.

Instead of using the prisms 15, 16 and 17, use may be made of mirrors which may be arranged, for example, at the area and in the position of that side face of the relevant prism which completely reflects the light beam.

Therefore, while the invention has been described with reference to a particular embodiment thereof, other modifications will be apparent to those skilled in the art without departing from the spirit and scope of the invention as defined in the appended claims.

I claim:

1. A color television camera comprising an objective, a plurality exceeding two camera tubes, a prism system positioned between the objective and the camera tubes, said prism system having at least two dichroic layers which make angles of less than 30° with a plane extending transversely to a nonreflecting optical axis and which are successively struck by light beams passing from the objective through the prism system, light being reflected along a given axis from each dichroic layer in a given wavelength range, reflected and passed light being supplied to separate camera tubes, and a light-deflecting system positioned between the color-separating prism system and each of the camera tubes, parts of the light-deflecting systems facing the camera tubes having optical axes parallel to each other, the parallel optical axes of the light-deflecting systems extending transversely to the plane containing the nonreflecting and the reflecting optical axes of the color-separating prism system.

2. A color camera as claimed in claim 1 in which the light-deflecting system is a prism having two side faces which are at right angles to one another, the light beam entering the prism being directed at right angles to one side face and the emanating light beam leaving in a direction at right angles to the other side face, the light beam being completely reflected from a third side face.

3. A color camera as claimed in claim 2 in which the angle between the third side face and the two first mentioned side faces is 45°.